(12) United States Patent
Uda et al.

(10) Patent No.: US 8,121,486 B2
(45) Date of Patent: Feb. 21, 2012

(54) OPTICAL TRANSMISSION APPARATUS

(75) Inventors: Tetsuya Uda, Yokohama (JP); Hiroshi Takeuchi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 651 days.

(21) Appl. No.: 12/027,383

(22) Filed: Feb. 7, 2008

(65) Prior Publication Data

US 2008/0253763 A1 Oct. 16, 2008

(30) Foreign Application Priority Data

Mar. 14, 2007 (JP) ................................. 2007-064338

(51) Int. Cl.
*H04B 10/08* (2006.01)
*H04B 10/02* (2006.01)
*H04J 14/02* (2006.01)

(52) U.S. Cl. .............. 398/97; 398/79; 398/177; 398/65; 398/32

(58) Field of Classification Search .................. 398/177, 398/65, 32, 97, 79
See application file for complete search history.

(56) References Cited

U.S. PATENT DOCUMENTS

| | | | |
|---|---|---|---|
| 6,614,567 B1 * | 9/2003 | Al-Salameh et al. | 398/79 |
| 7,463,829 B2 * | 12/2008 | Uda et al. | 398/97 |
| 7,580,631 B2 | 8/2009 | Shimada | |
| 2001/0022684 A1 | 9/2001 | Kobayashi | |
| 2003/0223106 A1 * | 12/2003 | Lee et al. | 359/341.33 |
| 2004/0057732 A1 * | 3/2004 | Usui et al. | 398/177 |
| 2004/0197105 A1 * | 10/2004 | Khatana et al. | 398/173 |
| 2005/0146782 A1 * | 7/2005 | Takeyama et al. | 359/337.1 |
| 2005/0213968 A1 * | 9/2005 | Uda et al. | 398/30 |
| 2006/0023298 A1 * | 2/2006 | Ohshima et al. | 359/349 |
| 2006/0024063 A1 * | 2/2006 | Onaka et al. | 398/149 |
| 2006/0203329 A1 * | 9/2006 | Nishihara et al. | 359/337 |
| 2007/0058241 A1 * | 3/2007 | Chang et al. | 359/337.12 |
| 2007/0116470 A1 * | 5/2007 | Mino | 398/93 |
| 2007/0201876 A1 * | 8/2007 | Sugaya | 398/141 |
| 2008/0253763 A1 * | 10/2008 | Uda et al. | 398/34 |
| 2009/0324229 A1 * | 12/2009 | Uda et al. | 398/79 |

FOREIGN PATENT DOCUMENTS

| | | |
|---|---|---|
| CN | 1674474 | 5/2010 |
| JP | 2000-349707 | 12/2000 |
| JP | 2001-257646 | 9/2001 |
| JP | 2005-277842 | 10/2005 |
| JP | 2007-104103 | 4/2007 |

OTHER PUBLICATIONS

Japanese Office Action issued Apr. 5, 2011 in corresponding Japanese Patent Application 2007-064338.
Yoshida, et al IEICE of Japan Communication Society Conference 1996, No. 81096, pp. 581 (with English language Translation).

* cited by examiner

*Primary Examiner* — Shi K Li
*Assistant Examiner* — Oommen Jacob
(74) *Attorney, Agent, or Firm* — Antonelli, Terry, Stout & Kraus, LLP.

(57) ABSTRACT

An optical transmission apparatus is arranged by: means for demultiplexing monitoring light for received wavelength-multiplexed signal light so as to detect optical intensity of the monitoring light; means for detecting optical intensity of wavelength-multiplexed signal light after the monitoring light has been demultiplexed therefrom; a gain controlling type optical amplifier for amplifying the wavelength-multiplexed signal light; an optical attenuating unit for adjusting optical intensity of the amplified wavelength-multiplexed signal light; and a monitoring control unit for controlling the gain controlling type optical amplifier in such a manner that the gain of the optical amplifier becomes constant, and for controlling an attenuating amount of the optical attenuating unit in such a manner that the optical intensity of the wavelength-multiplexed signal light becomes a predetermined target value.

8 Claims, 7 Drawing Sheets

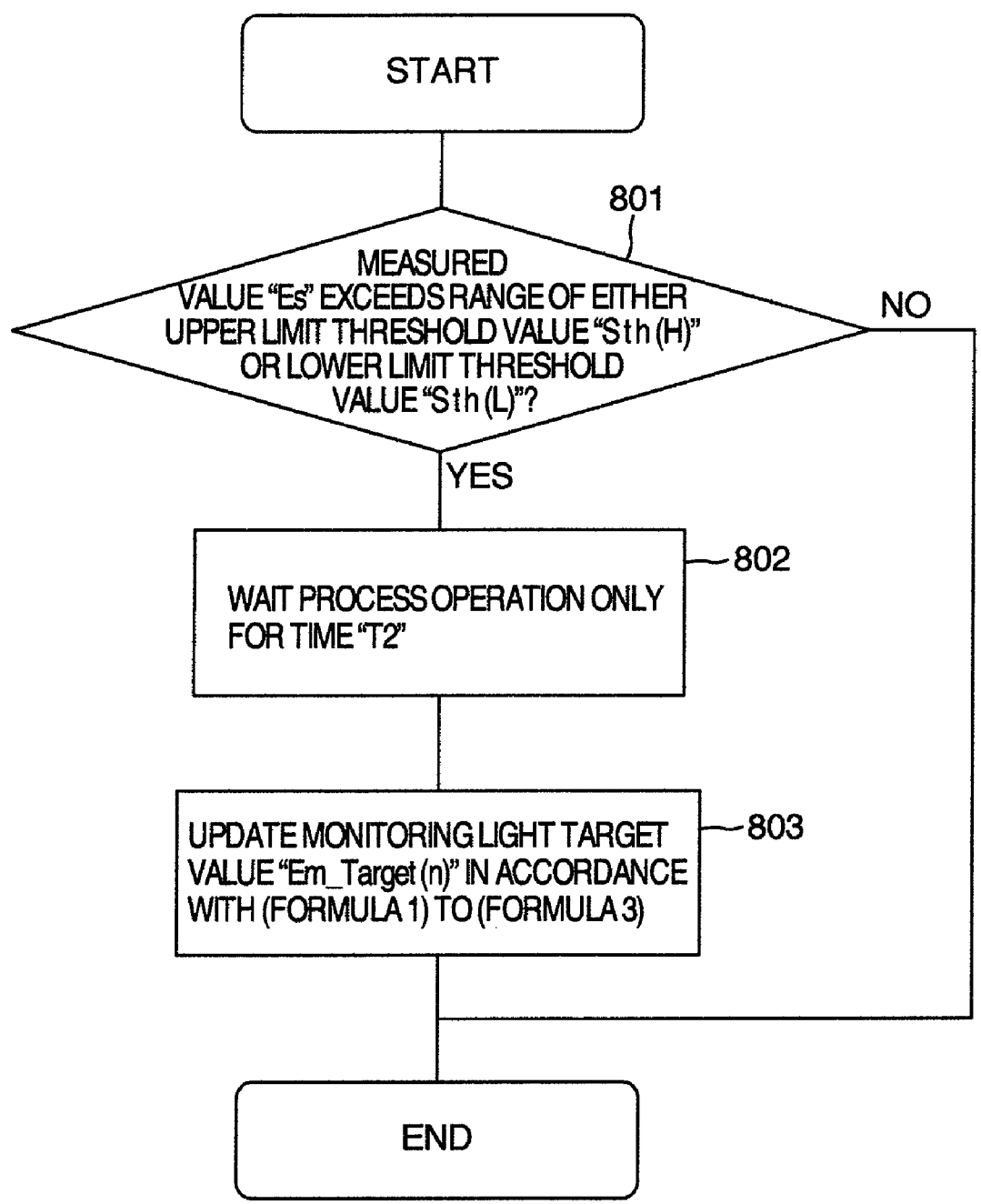

OPTICAL TRANSMISSION APPARATUS

INCORPORATION BY REFERENCE

The present application claims priority from Japanese application JP 2007-064338 filed on Mar. 14, 2007, the content of which is hereby incorporated by reference into this application.

BACKGROUND OF THE INVENTION

The present invention generally relates to an optical transmission apparatus and a control method thereof. More specifically, the present invention is directed to an optical transmission apparatus and a control method thereof, which are provided for an optical transmission system by which a plurality of signal light is wavelength-multiplexed so as to transmit the wavelength-multiplexed signal light.

In optical communication systems, generally speaking, while communication capacities are enlarged, in order to reduce costs of the optical communication systems, wavelength-multiplexed light transmission techniques have been applied. That is, in the wavelength-multiplexed light transmission techniques, a plurality of signal light having wavelengths different from each other are bundled within a single optical fiber so as to communicate the bundled signal light via the signal optical fiber. Also, in actual optical communication systems, in order to compensate losses as to power levels of optical signals occurred in an optical fiber which constitutes a transmission path between two points separated from each other over a distance, optical fiber amplifies are installed on the transmission path, and while the optical signals are not converted into electric signals during transmissions, the optical fiber amplifiers amplify the plurality of signal light having the different wavelengths from each other in a batch mode.

Optical fiber amplifiers have wavelength dependent characteristics in amplification factors (gains) with respect to signal light. For instance, in such a case of an optical fiber amplifier which amplifies optical signals having a wavelength range defined from 1530 nm up to 1560 nm, an amplification gain with respect to signal light having a wavelength near 1530 nm becomes higher than an amplification gain with respect to signal light having a wavelength near 1560 nm. This wavelength dependent characteristic of the gain changes in response to a change in gains of the optical fiber amplifier. In order to adjust the wavelength dependent characteristic of the gain of the optical fiber amplifier, it is desirable to realize that the wavelength dependent characteristic is not varied by keeping the gain constant. To this end, in optical fiber amplifiers, in order to achieve flat gain characteristics of signal light having a plurality of multiplexed wavelengths, a constant gain control capable of keeping a gain constant has been carried out. A constant gain control in an optical fiber amplifier may be realized by that for instance, while intensity of wavelength-multiplexed signal light on the input side of the optical fiber amplifier and intensity of wavelength-multiplexed signal light on the output side thereof are measured, pumping light of the optical fiber amplifier is controlled in such a manner that an intensity ratio (gain) of the input signal light to the output signal light always becomes constant.

Also, if a loss occurred in a transmission path changes only under the constant gain control, then intensity of an input optical signal of a signal repeater optical amplifier changes, and intensity of an output optical signal of the signal repeater optical amplifier changes in response to the first-mentioned intensity change. As a result, intensity of an input optical signal of a reception-sided optical transmission apparatus may eventually change, and thus, there are some possibilities that an input signal level of a receiver may be deviated from a dynamic range. In an optical transmission system, in order to solve the above-explained restriction in the input dynamic range of the receiver and also non-linear effects of optical fibers, a constant output intensity control (will be simply referred to as "constant output control" hereinafter) capable of keeping intensity of output signal light constant every wavelength is carried out in addition to the above-described constant gain control.

In a constant output control, for instance, total output light intensity of an optical amplifying unit containing an optical fiber amplifier is calculated based upon a total number of previously designated multiplexed signal light (namely, total multiplexed wavelength number) and output light intensity every wavelength; and an attenuating amount of an optical attenuating unit such as an optical attenuator provided at a post stage of the optical fiber amplifier may be controlled in such a manner that the total output light intensity of the optical amplifying unit becomes desirable light intensity. In accordance with this constant output control, the light signal outputted from the optical amplifying unit is controlled to have the desirable constant light intensity in such a manner that a loss change is canceled with respect to a variation in light intensity in combination with the loss change of the optical fiber.

As previously described, there are two control modes in the optical amplifying unit; namely, the constant gain control and the constant output intensity control capable of compensating the change in the signal intensity, which is caused by the loss variation of the transmission path. In this case, when a wavelength-multiplexed optical signal is optically amplified based upon the constant output intensity control, as previously described, since the total number of the multiplexed wavelengths is employed, a problem may occur in such a case that a difference is produced between the total multiplexed wavelength value, and a total wavelength number of multiplexed signal light which has been actually inputted to the optical fiber amplifier. In an optical transmission system, for example, in the case that a portion of plural sets of transmitters stored in optical fibers is brought into malfunction, and/or an optical fiber for coupling a transmitter to a wavelength multiplexing unit is extracted, a total number of signal light (total wavelength number) may change which is wavelength-multiplexed on the optical fiber. In this case, at a time instant when a failure happens to occur, the respective optical fiber amplifiers instantaneously cannot grasp a status of the actually multiplexed wavelength number. As a result, such a matching condition can be no longer established between a total wavelength number which constitutes an initial condition for the constant output intensity control, and a total number of wavelengths which have been physically multiplexed on the optical fiber.

As a consequence, when an optical signal having a certain wavelength drops due to a maintenance work, or a failure, while such a total output light intensity is employed as the target value, which is calculated based upon a larger signal light number than a total number of actually multiplexed signal light, a constant output intensity control of an optical fiber amplifier is performed. In this case, output light intensity per 1 signal light becomes higher than the predetermined intensity value. As a result, there is such a problem that each of the signal light reaches a receiver in an excessively high input signal level. As a consequence, when there is a change in a total number of multiplexed wavelengths, the execution of not the constant output intensity control, but the constant gain control is required. If the constant gain control is carried out, even when the total wavelength number changes, amplification gains of optical signals are constant, so that the optical signals having the respective wavelengths are amplified in the constant gain, and thus, excessively higher amplifications can be avoided.

As previously explained, the constant gain control must be selected with respect to the change in the total wavelength numbers, whereas the constant output intensity control must be selected with respect to the loss variation of the transmission path. As methods for switching these two control modes, for example, one technical idea "OUTPUT LEVEL CONTROL SYSTEM FOR WDM-PURPOSE OPTICAL AMPLIFIER" has been proposed in "Communication Society Meeting held by Electronic Information Telecommunication Institute in 1996", Lecture No. B1096 lectured by YOSHIDA et. al. That is, in this output level control system, the intensity of the output light per 1 signal light is controlled to become the desirable intensity by detecting the total intensity of the signal light outputted from the optical amplifier, and the total number of the wavelengths stored in the optical transmission system. In this output level control system, the below-mentioned initial condition has been conducted. That is, under this initial condition, the speed as to the loss variation of the transmission path is sufficiently slow, as compared with the control speed of the optical amplifier, and on the other hand, the transient response characteristic of the signal intensity change in combination with the change in the total number of the wavelengths to be multiplexed is sufficiently fast, as compared with the control speed of the optical amplifier. Based upon the above-described initial condition, in the above-described output level control system, two sorts of the above-described variation factors may be discriminated from each other in accordance with a change in the changing speeds of the optical signal intensity measured in the optical transmission apparatus. The change in the wavelength numbers corresponds to, for example, such an event occurred in a changing operation of a communication path for connecting a transmission point to a reception point. Then, it is so supposed that a changing speed of optical signal intensity due to the above-described change in the wavelength numbers is lower than, or equal to several hundreds microseconds. The loss variation of the transmission path corresponds to, for example, such an abnormal event occurs when a maintenance worker of an optical transmission system pulls an optical fiber, or hooks an optical fiber. Then, it is so assumed that a changing speed of optical signal intensity due to the above-explained loss variation of the transmission path is higher than, or equal to several milliseconds.

When an attention is paid to the above-explained difference in the changing speeds, while a frequency threshold value has been previously set with respect to a total signal intensity change detected from multiplexed input light of the optical amplifier, the above-described control system can judge that the occurrence factor of the signal intensity variation is caused by either the change in the wavelength numbers or the loss change of the transmission path by checking whether or not a changing speed of total signal intensity in combination with an occurrence of a certain event exceeds the preset frequency threshold value. Also, in response to the judged occurrence factor of the total signal intensity change, such a control mode which should be performed in the optical amplifying unit can be determined. In this case, as the control mode of the optical amplifying unit, as previously explained, when the occurrence of the loss variation is detected, the constant output intensity control is employed, whereas when the change in the wavelength numbers is detected, the constant gain control is employed.

Also, as another method capable of solving the problems caused by the change in the wavelength numbers and the loss variation of the transmission path, JP-A-2001-257646 has proposed the below-mentioned control method: That is, the monitoring control-purpose monitoring light called as pilot light (probe light) is extracted by the branching element provided on the output side of the optical amplifier, and then, the optical amplifier is controlled in such a manner that the optical intensity of the probe light becomes constant. In the control method of JP-A-2001-257646, both the constant output intensity control and the constant gain control of the optical amplifier are carried out by paying an attention only to the intensity change of the probe light. As a result, in this control method, the factors as to the intensity changes of the signal light need not be discriminated from each other, whereas these factors are discriminated from each other in "Communication Society Meeting held by Electronic Information Telecommunication Institute in 1996", Lecture NO. B1096 lectured by YOSHIDA et. al. Also, since there is also no specific restriction as to the responding time constant of the optical amplifier, the above-described optical amplifier control method can be applied with respect to such a high-speed loss variation (lower than, or equal to several milliseconds) of the transmission path, and further, such a low-speed change (higher than, or equal to several milliseconds) in the wavelength numbers.

SUMMARY OF THE INVENTION

However, in the above-described method for judging the occurrence of the event based upon the frequency threshold value, for instance, in such a case that a change in wavelength numbers occurs at a low speed higher than, or equal to 1 millisecond, it is not so recognized that a change in total signal intensity is caused by the change in the wavelength numbers, but it is so recognized that the change in the total signal intensity is caused in the loss change occurred in the transmission path. In this case, as the control mode of the optical amplifier, the constant output intensity control for holding the output light intensity as the target value is selected, and thus, such a control operation is carried out by which the signal light intensity of the respective wavelengths is increased at a level higher than the necessary level. As previously described, when the discriminating operation as to the variation factors can be hardly carried out, there are some possibilities that although any one of these variation factors actually occurs, such a control method which does not correspond to this actually occurring variation is performed, so that an adverse influence may be eventually given to the signal qualities. In other words, the method for controlling the optical amplifier by detecting the multiplexed-wavelength number can be adapted only to the loss variation in the transmission path, whose changing speed is relatively slow, or only to the variation of the total wavelength numbers, whose changing speed is relatively fast.

Also, in the method with employment of the probe light, the control operation of the optical amplifier depends upon the probe light corresponding to the specific light. As a result, when an abnormal event happens to occur in the probe light due to some reasons such as a failure of a light source, the control operation of the optical amplifier is carried out by employing intensity of such a probe light where the abnormal event occurs. As a result, there is such a risk that the control operation of the optical amplifier is erroneously carried, and thus, a problem may occur in the transmission of the signal light.

An object of the present invention is to provide an optical transmission apparatus and a control method thereof, which are operable as follows: That is, even under a steady-state condition that a loss variation of a transmission path and a change in total multiplexed-wavelength numbers are not present, and also, even under an abnormal condition that the loss variation of the transmission path and the change in the total multiplexed-wavelength numbers happen to occur, since the constant output intensity control and the constant gain control corresponding to the control systems are properly determined based upon a changing reason of light intensity, the optical transmission apparatus and the control method thereof can properly control intensity of signal light so as to secure a communication quality.

In order to achieve the above-described object, the optical transmission apparatus, according to the present invention, is featured by that while an optical attenuator is arranged at a prestage of an optical amplifier, a constant output intensity control by the optical attenuator is carried out by employing an optical signal having a certain wavelength such as monitoring light; intensity of wavelength-multiplexed signal light is monitored at a front stage and a rear stage of the optical amplifier respectively; and a constant gain control is carried out in such a manner that a ratio of the monitored intensity of the wavelength-multiplexed signal light is approximated to a constant value.

In accordance with the optical transmission apparatus related to the present invention, the constant output intensity control and the constant gain control can be properly determined in response to the changing reason of the light intensity, and thus, the intensity of the signal light can be controlled in a proper manner.

Other objects, features and advantages of the invention will become apparent from the following description of the embodiments of the invention taken in conjunction with the accompanying drawings.

BRIEF DESCRIPTION OF THE DRAWINGS

FIG. 8 is a flow chart for describing process operations for updating the target value "Em_target (n)" in the case that a total wavelength number changes.

DETAILED DESCRIPTION OF THE INVENTION

Referring now to drawings, a description is made of an optical wavelength multiplexing transmission system and a control method thereof, according to an embodiment of the present invention.

Figure 1:
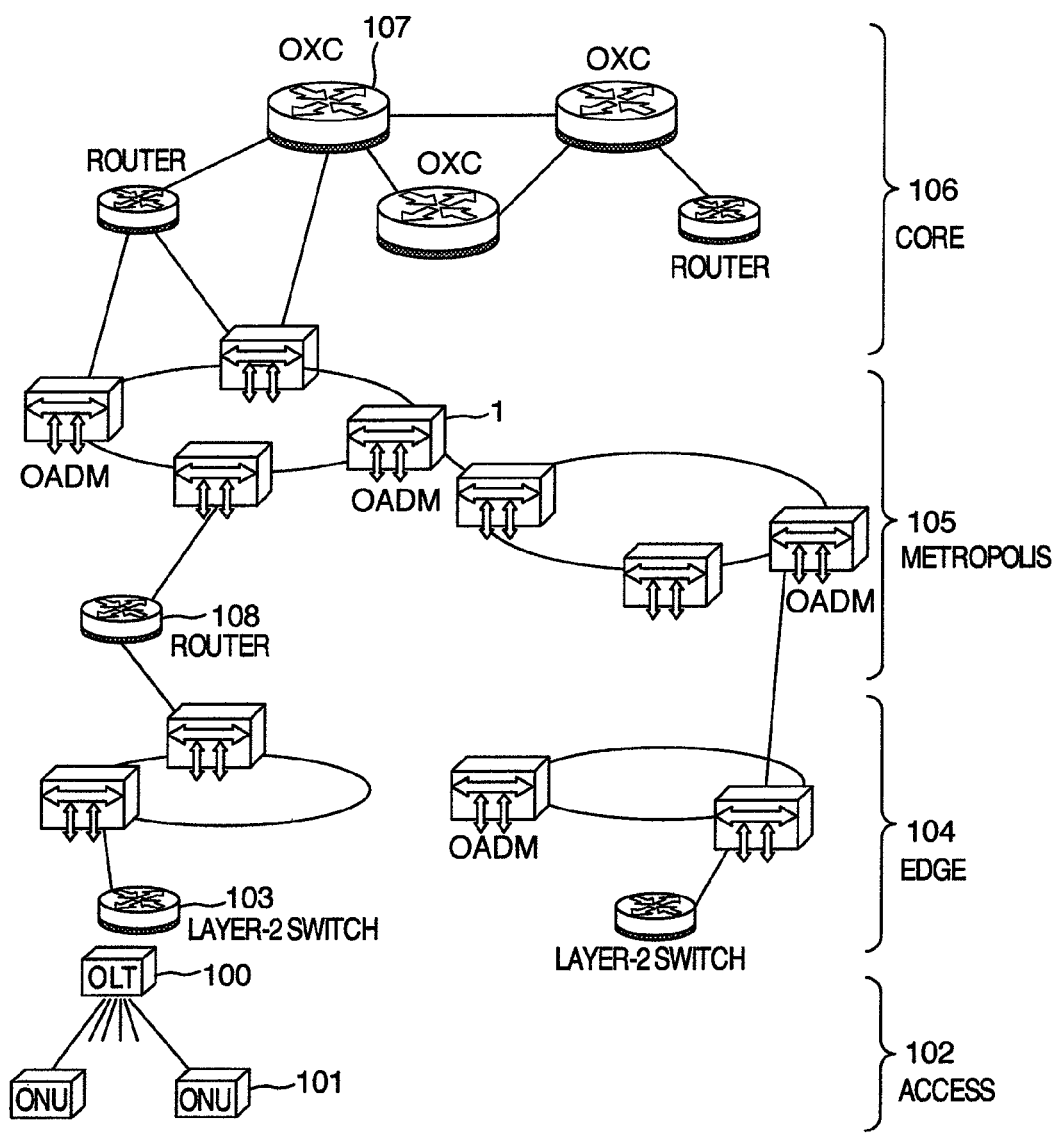
FIG. 1 is a diagram for illustratively showing an embodiment of a network to which an optical transmission apparatus according to the present invention is applied.

FIG. 1 illustratively shows a general network structure with employment of the optical wavelength multiplexing transmission system to which the present invention is applied. The general network structure is arranged by an access 102, an edge 104, a metropolis 105, and a core 106. The access 102 provides the FTTH (Fiber To the Home) services with respect to subscribers in the unit of a region by employing an OLT 100 (Optical Line Terminal) apparatus, or an ONU 101 (Optical Network Unit) apparatus. The edge 104 intensively collects communications from the subscribers in the unit of the region in a region group by employing a plurality of L2 (Layer-2) switches 103. The metropolis 105 extensively collects the communications which have been extensively collected by the L2 switches 103 in the unit of a city. The core 106 is mainly constituted by OXCs 107 in order to transmit a large capacity of communications in a higher efficiency among large cities over long distances, while the large capacity of communications have been exclusively collected in the unit of the city. The respective hierarchical layers are properly connected to each other by employing routers 108, and the like. In the above-described network, an OADM (Optical Add Drop Multiplexer) apparatus 1 is such an optical transmission system which is provided in order that communications which have been dispersed in a relatively wide range are intensively collected to one place.

Figure 2:
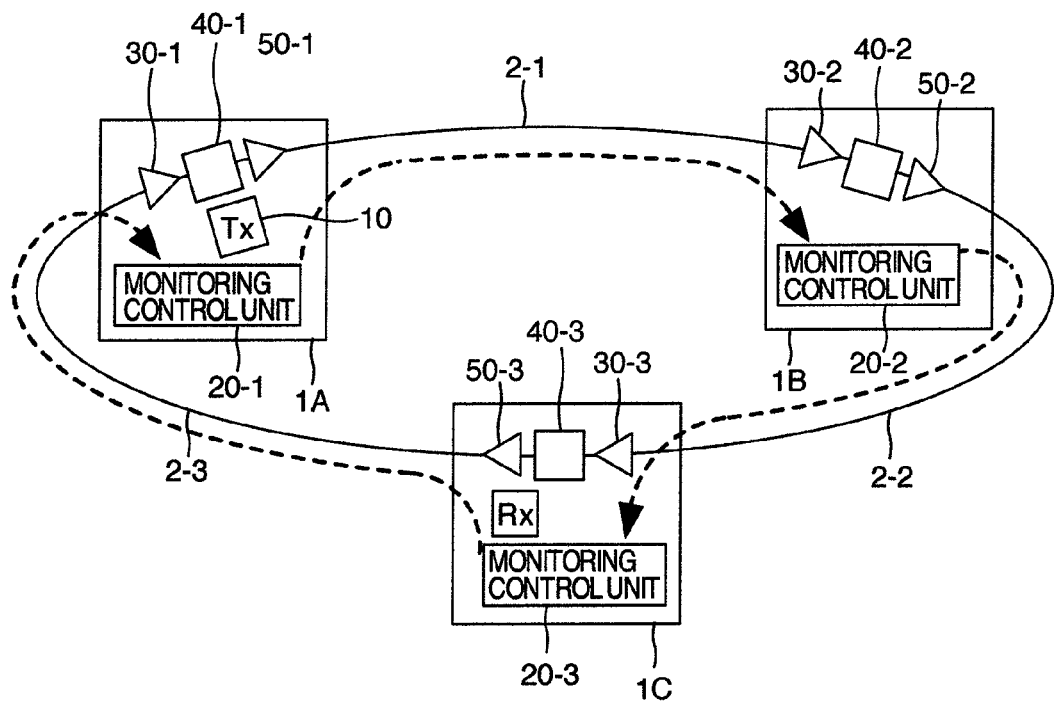
FIG. 2 is a diagram for indicating an embodiment of a schematic structure of a ring type optical wavelength multiplexing transmission system, to which the present invention is applied.

FIG. 2 is diagram for representing a schematic structure of a ring type optical wavelength multiplexing system corresponding to one embodiment of an optical transmission system to which the present invention is applied. The optical transmission system is arranged by a plurality of optical transmission apparatuses 1 (namely, 1A, 1B, 1C) such as OADMs, which have been connected to each other via optical fibers 2 (namely, 2-1, 2-2). The optical fibers 2 constitute transmission paths. Signal light outputted from a transmitter 10 mounted on the optical transmission apparatus 1A is wavelength-multiplexed by an optical multiplexing/demultiplexing unit 40-1, the wavelength-multiplexed signal light is amplified by a transmission light amplifying unit 50-1, and thereafter, the amplified signal light is propagated via an optical fiber 2-1, the optical transmission apparatus 1B, and an optical fiber 2-2 to reach the optical transmission apparatus 1C provided on the opposite side, and then, the reached signal light is wavelength-demultiplexed by a multiplexing/demultiplexing unit 40-3. Thereafter, the wavelength-demultiplexed signal light is received by a receiver 11 of the optical transmission apparatus 1C. While the signal light transmitted from the optical transmission apparatus 1A passes through the optical fibers 2, optical intensity thereof is lowered due to a propagation loss. In order to compensate this lowered optical intensity, a reception light amplifying unit 30-2, a multiplexing/demultiplexing unit 40-2, and a transmission light amplifying unit 50-2 have been mounted on the optical transmission apparatus 1B, whereas a reception light amplifying unit 30-3 has been mounted on the optical transmission apparatus 1C.

The respective optical transmission apparatuses 1A to 1C have been equipped with monitoring control units 20-1 to 20-3, respectively. A monitoring control unit 20 produces monitoring information, for example, alarm information, status information of an apparatus, and a total number of multiplexed signal light, which are required in the relevant optical transmission apparatus, and then, transmits/receives the produced monitoring information as monitoring light with respect to other optical transmission apparatuses. As represented as broken lines in FIG. 2, the monitoring light transmitted from the monitoring control unit 20-1 of the optical transmission apparatus 1A has been reception-processed by the monitoring control unit 20-2 of the relay-purpose optical transmission apparatus 1B which is located adjacent to the above-described optical transmission apparatus 1A, whereas the monitoring light transmitted from the monitoring control unit 20-2 of the optical transmission apparatus 1B has been reception-processed by the monitoring control unit 20-3 of the optical transmission apparatus 1C.

Figure 3:
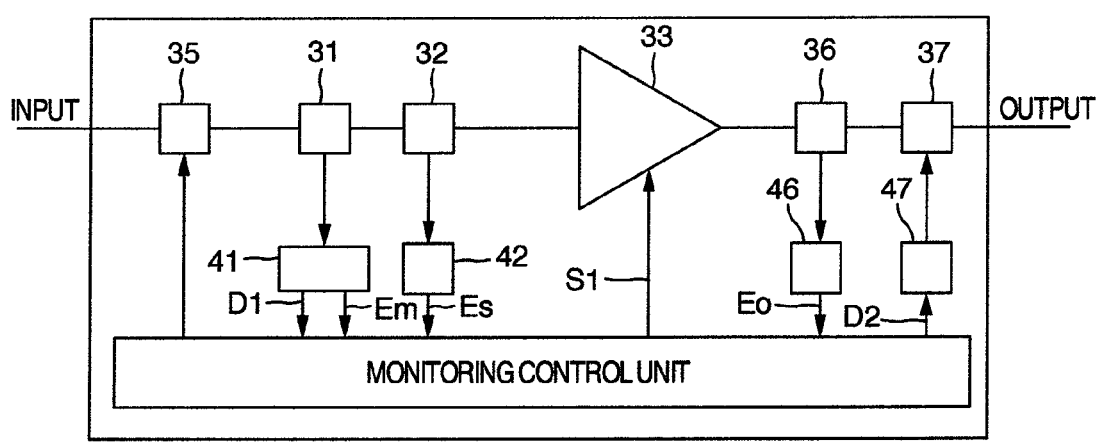
FIG. 3 is a diagram for showing an internal arrangement of an optical amplifying unit 30 which is mounted on an optical transmission apparatus 1 (1A to 1B) of FIG. 1.

FIG. 3 is a structural diagram for showing an embodiment of one optical amplifying unit 30 which is mounted on the optical transmission apparatus 1. The optical amplifying unit 30 has been equipped with an optical attenuating unit 35, an optical demultiplexer 31, a monitoring light receiver 41, an optical branching unit 32, an optical amplifier 33, another optical branching unit 36, a monitoring control unit 20, a monitoring light transmitter 47, and an optical multiplexer 37. The optical attenuating unit 35 is capable of freely adjusting a passing loss of incident light thereof with respect to the optical amplifier 33. The optical demultiplexer 31 optically demultiplexes monitoring light from output light derived from the optical attenuating unit 35. The monitoring light receiver 41 converts the monitoring light into monitoring information which corresponds to an electric signal. The optical branching unit 32 such as a optical coupler optically branches a portion of the signal light which has passed the monitoring information demultiplexer 31. The optical amplifier 33 is constructed of an optical fiber amplifier, or the like, and optically amplifies signal light within such a wavelength range of the light which has passed the optical branching unit 32. The optical branching unit 36 such as an optical coupler optically branches a portion of the signal light outputted from the optical amplifier 33. The monitoring control unit 20 receives monitoring information from another optical transmission apparatus and processes the received monitoring information so as to produce monitoring information which is transmitted to a further optical transmission apparatus. The monitoring light transmitter 47 outputs the monitoring information from the monitoring control unit 20 as monitoring light. The optical multiplexer 37 optically multiplexes the monitoring light outputted from the monitoring light transmitter 47 with the signal light passed through the optical coupler 36 so as to transmit the optically multiplexed signal light to an optical fiber provided on the output side.

The monitoring light which has been optically demultiplexed from the signal light by the optical demultiplexer 31 is entered to the monitoring light receiver 41, and then, both monitoring light intensity "Em" and control information "D1" extracted from the monitoring light are outputted from the monitoring light receiver 41 to the monitoring control unit 20. These optical demultiplexer 31 and the monitoring light receiver 41 constitute such a means for monitoring intensity of monitoring light. The signal light branched by the branching unit 32 is inputted to a detector 42 for detecting intensity of the signal light, and then, an output of the detector 42 is entered as input intensity "Es" of the signal light which has been wavelength-multiplexed to the monitoring control unit 20. These optical branching unit 32 and the detector 42 constitute such a means for monitoring intensity of the wavelength-multiplexed signal light before being inputted to the optical amplifier 33. The signal light branched by the branching unit 36 is entered to another detector 46, and then, an output of the detector 46 is entered to the monitoring control unit 20 as intensity "Eo" of the signal light after being amplified. These branching unit 36 and detector 46 constitute such a means for monitoring intensity of wavelength-multiplexed signal light after being outputted from the optical amplifier 33.

The monitoring control unit 20 monitors intensity of light outputted from the monitoring light receiver 41, the detector 42, and the receiver 46; performs the above-described constant gain control, constant output intensity control, and a control of suppressing the constant output intensity control; and also, relays the control information "D1" to the monitoring light transmitter 47 as monitoring information "D2." Under the constant gain control, energizing light of the optical fiber amplifier 33 is adjusted in such a manner that a ratio of the signal light input intensity "Es" to the amplified signal light intensity "Eo" is kept constant.

In the present embodiment, as represented by broken lines in FIG. 2, the monitoring light transmitted from the monitoring control unit 20-1 of the optical transmission apparatus 1A passes through the optical attenuating unit 35 mounted on the optical amplifying unit 30-2 of the relay-purpose optical transmission apparatus 1B, is optically demultiplexed from the signal light before being inputted to the optical amplifier 33, and then, the optically demultiplexed monitoring light is entered to the monitoring control unit 20-2. Also, the monitoring light outputted from the monitoring control unit 20-2 is optically multiplexed with the signal light on the output side of the optical amplifying unit 30-2, the optically multiplexed monitoring light passes through the optical attenuating unit 35 mounted on the optical amplifying unit 30-3 of the optical transmission apparatus 1C, is optically demultiplexed from the signal light before being inputted to the optical amplifier 33, and then, the optically demultiplexed monitoring light is entered to the monitoring control unit 20-3.

In other words, both the signal light and the monitoring light are entered to the optical attenuating unit 35 mounted on the optical amplifying unit 30, and the monitoring light is not entered to the optical amplifier 33, whereas only the signal light is entered to the optical amplifier 33. As a consequence, for instance, in such a case that a loss variation happens to occur within the section of the optical fiber 2-1, not only intensity of the signal light, but also intensity of the monitoring light entered to the monitoring control unit 20-2 change at the same time in the relay-purpose optical transmission apparatus 1B subsequent to the optical fiber 2-1. Also, when a total number (namely, total number of wavelengths) of signal light transmitted from the optical transmission apparatus 1A to the optical fiber 2-1 is increased and/or decreased, while intensity of the monitoring light entered to the monitoring control unit 20-2 does not change, only intensity of the signal light entered to the optical amplifier 33 changes.

As a consequence, the monitoring control unit 20-2 performs the constant output intensity control in such a manner that power of the detected monitoring light becomes predetermined light intensity with respect to the optical attenuating unit 35 while the power of the monitoring light is set as a target value. Also, in the case that a total number (total number of wavelengths) of the signal light changes, the monitoring control unit 20-2 performs the constant gain control of the optical amplifier 33 based upon intensity of wavelength-multiplexed signal light inputted to the optical amplifier 33 and intensity of wavelength-multiplexed signal light outputted from this optical amplifier 33. As previously explained, the monitoring control unit 20-2 of the present embodiment monitors the intensity of the signal light inputted/outputted with respect to the optical amplifier 33 so as to perform the constant gain control with respect to the intensity of the signal light. Moreover, the monitoring control unit 20-2 monitors the intensity of the monitoring light outputted from the optical attenuating unit 35 so as to perform the constant output intensity control with respect to the intensity of the monitoring light. The optical attenuating unit 35 is arranged at the prestage of the optical amplifier 33, and this optical attenuating unit 35 is controlled based upon the monitoring light. As a result, while fluctuations contained in the intensity of the original light are compensated which are caused by the loss variation of the transmission path and the like, the constant output intensity control can be carried out which cannot be seriously and adversely influenced based upon the change in the total wavelength number. Also, since the constant gain control by the optical amplifier 33 provided at the post stage of the optical attenuator 35 is carried out based upon not the monitoring light, but the intensity of the input/output signal light, even when an abnormal event happens to occur in the monitoring light, the adverse influence is not given to the constant gain control.

Next, a description is made of a method for controlling an output of the optical attenuating unit 35 by employing intensity of monitoring light. Basically, the monitoring control unit 20 controls the optical attenuating unit 35 in such a manner that intensity "Em" of actual monitoring light observed by the monitoring light receiver 41 is approximated to a target value "Em_target" of intensity of monitoring light, which has been previously determined. In this case, alternatively, the target value "Em_target" may be set as a value which is fixedly determined based upon a characteristic of an optical transmission system which is to be constructed.

However, a control subject for the constant output intensity control is such a signal light which has been wavelength-multiplexed, whereas signal light which is employed in the constant output intensity control for the optical attenuater 35 is monitoring light. As a result, there are some cases that there is an error between a target value of signal light intensity which is wanted to be controlled as constant light intensity, and intensity of actual signal light. If this error is reflected to the control operation with employment of the monitoring light, then reliability of the optical transmission system may be improved. As a consequence, in the present embodiment, the target value "Em_target" of the monitoring light intensity is updated by employing an actually measured intensity value "Es" of signal light detected by the detector 42, and another target value "Es_target" of signal light intensity per 1 wavelength, which has been previously determined.

Figure 6:
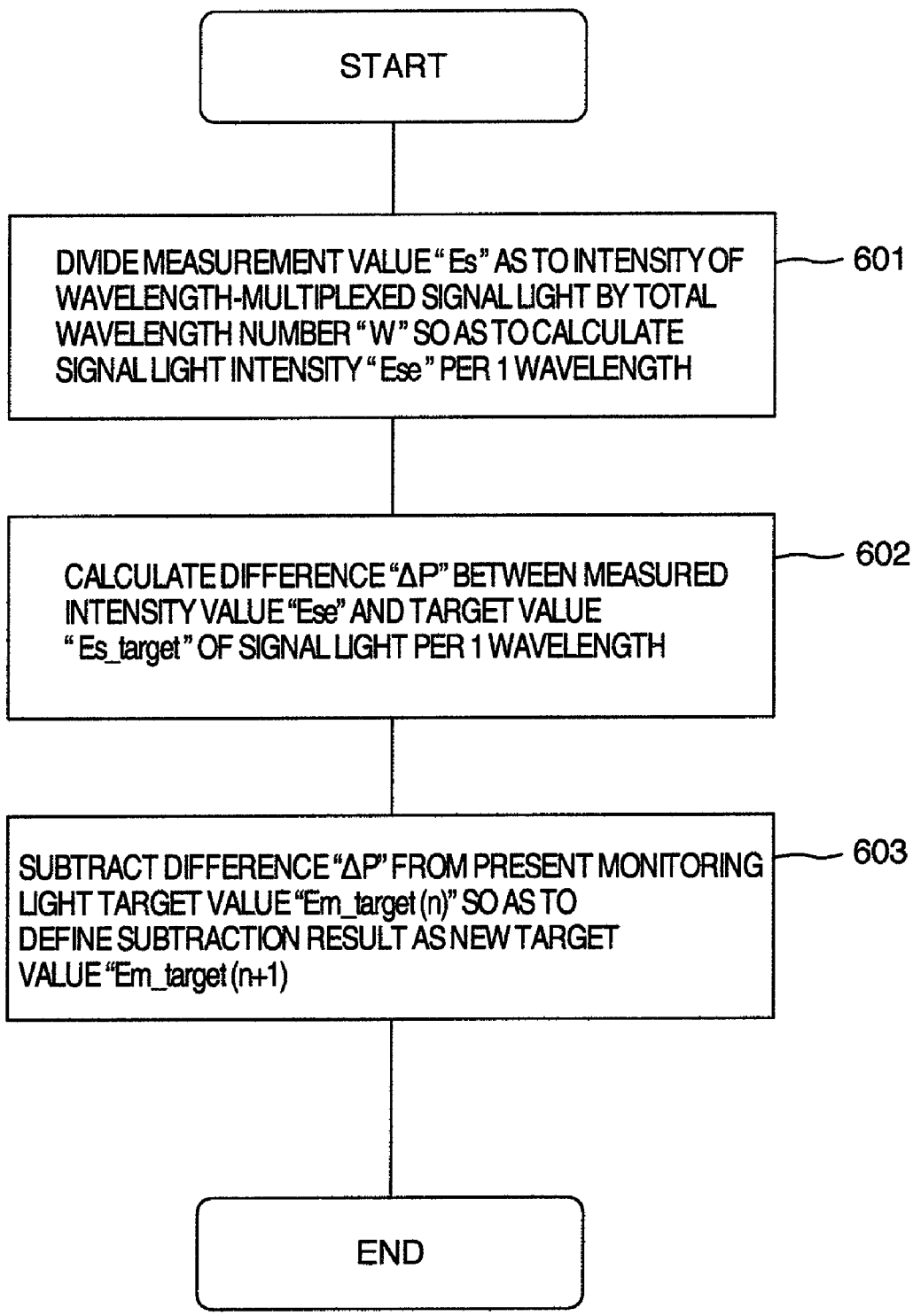
FIG. 6 is a flow chart of process operations for updating a monitoring light target value "Em_target (n)."

It should be noted that the target value of the intensity of the monitoring light will be expressed as "Em_target (n)" in the below-mentioned description. Symbol "Em_target (n−1)" indicates a target value which was used in a preceding control operation; symbol "Em_arget (n)" represents a target value which is presently used in a control operation; and symbol "Em_target (n+1)" shows a target value which is newly updated. FIG. 6 indicates a process flow chart for updating the above-explained target value "Em_target (n)."

First of all, the monitoring control unit 20 calculates intensity "Ese" of signal light per 1 wavelength based upon the actually measured value "Es" of the intensity of the signal light inputted to the optical amplifier 33, and also, a multiplexing wavelength number "W" of the signal light (step 601):

$$Ese=Es/W \quad \text{(formula 1)}$$

Next, the monitoring control unit 20 calculates an error "ΔP" between the signal light intensity "Ese" and the control target value "Es_target" of the signal light intensity per 1 wavelength (step 602):

$$\Delta P=Ese-Es\_target \quad \text{(formula 2)}$$

Then, the monitoring control unit 20 subtracts the previously calculated error "ΔP" from the target value "Em_target (n)" of the intensity of the monitoring light, which is presently set, so that the monitoring control unit 20 acquires a new target value "Em_target (n+1)" of the intensity of the monitoring light by performing a calculation (step 603):

$$Em\_target(n+1)=Em\_target(n)-\Delta P \quad \text{(formula 3)}$$

The monitoring control unit 20 makes the correction with respect to the monitoring light target value "Em_target (n)" used to perform the constant output intensity control based upon the above-described (formula 1) to (formula 3), and then, performs the constant output intensity control by employing the new monitoring light target value "Em_target (n+1)" after the correction. As a result, the monitoring control unit 20 can reflect the change in the signal light intensity onto the target value of the monitoring light, and equivalently controls the intensity "Ese" of the signal light per 1 wavelength to the desirable target value "Es_target" of the signal light intensity in accordance with the constant output intensity control.

The target value "Es_target" of the signal light intensity corresponds to such a numeral value which is exclusively determined based upon the optical characteristic of the optical amplifier 33 in order to achieve a uniform gain over the entire amplification range, and may be determined as, for instance, −20 dBm. Also, an initial value of the monitoring light target value "Em_target" may be properly determined in correspondence with a characteristic of an optical transmission system which is to be constructed. It should also be understood that, as described above, since the target value "Em_target (n)" of the monitoring light in the present embodiment is such a value which is properly updated from the observed value "Es" of the signal light intensity and the target value "Es_target" of the signal light intensity, there is no need to strictly determine this target value "Em_target (n)" of the monitoring light intensity. As a result, for example, this target value "Em_target (n)" of the monitoring light intensity may be made equal to the target value "Es_target" of the signal light intensity, for instance, may also be set as −20 dBm.

It is so assumed that, for instance, the target value "Es_target" of the signal light intensity and the target value "Em_target (n)" of the monitoring light were −20 dBm, whereas the value of the calculated signal light intensity "Ese" was −23 dBm. In this case, the error "ΔP" is calculated as follows:

$$\Delta P=Ese-Es\_target=(-23)-(-20)=-3 \text{ dBm}$$

At this time, the intensity of the signal light has not yet been controlled as −20 dBm corresponding to the original control target value "Ese" but has been controlled as −23 dBm, so that this signal light intensity is such a value lower than the original control target value "Ese" by 3 dB. As a consequence, if a new target value "Em_target (n+1)" of the monitoring light is calculated by employing the immediately-before calculated target value "Em_target (n)" of the monitoring light, and the error "ΔP", then the below-mentioned calculation is performed:

$$Em\_target(n+1)=Em\_target(n)-\Delta P=(-20)-(-3)=-17 \text{ dBm}$$

If the monitoring control unit 20 controls the optical attenuating unit 35 by employing the target value "Em_target (n+1)" of the monitoring light intensity corresponding to this new control target value, then the controlled monitoring light is controlled to be attenuated by the optical attenuating unit 35 to become −17 dBm, and at this time, the signal light is controlled to be attenuated to become −20 dBm, so that the target may be achieved. As previously explained, the signal light can be controlled to become the control target value by employing the monitoring light.

Figure 4:
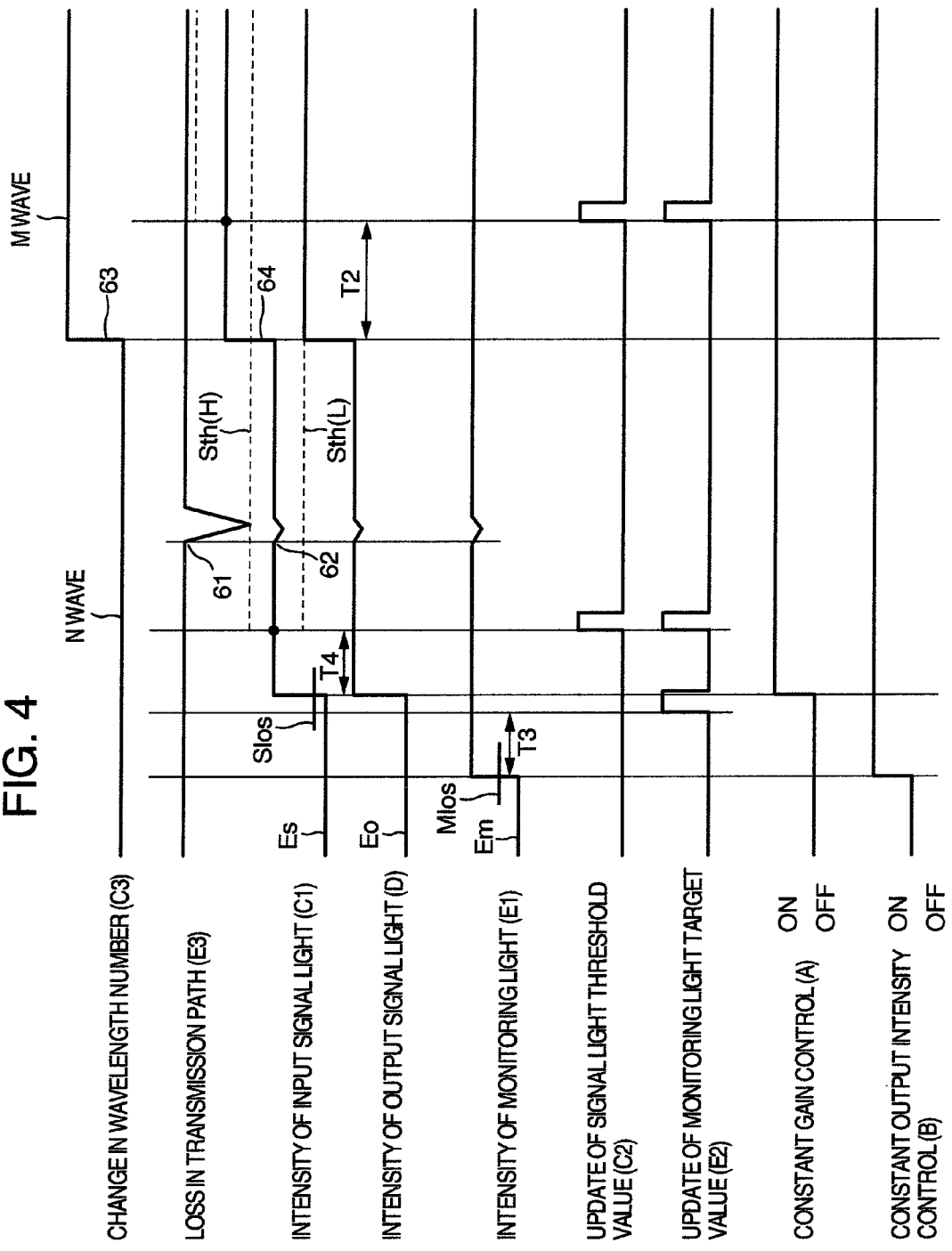
FIG. 4 is an explanatory diagram for explaining a relationship between a constant gain control and a constant output intensity control of the optical amplifying unit 30.

Next, referring now to a signal waveform diagram shown in FIG. 4, a description is made of both a constant gain control and a constant output intensity control, which are executed by the monitoring control unit 20 of the optical amplifying unit 30. An abscissa of FIG. 4 indicates an elapse of time. In FIG. 4, intensity (E1) of monitoring light indicates monitoring light intensity "Em" detected by the monitoring light receiver 41; intensity (C1) of input signal light indicates signal light intensity "Es" observed as the output of the detector 42 provided at the prestage of the optical amplifier 33; and intensity (D) of output signal light represents a change in signal light output intensity "Eo" observed as the output of the detector 46 provided at the post stage of the optical amplifier 33.

Symbol "Slos" in the input signal light intensity (C1) indicates a threshold value which is set in order to judge whether or not the input signal light is present. When the signal light intensity "Es" exceeds the threshold value "Slos," the monitoring control unit 20 judges that the signal light is inputted, and thus, the monitoring control unit 20 commences the constant gain control of the optical amplifier 33 as represented in a constant gain control (A). The threshold value "Slos" may be properly selected in correspondence with an optical transmission system which is to be constructed, it is conceivable that, for example, such a value in the vicinity of −30 dBm may be applied to this threshold value "Slos."

Symbols "Sth(H)" and "Sth(L)" shown in the input signal light intensity (C1) represent threshold values of signal light intensity which are set in order to judge whether or not there is a change in a total wavelength number of the signal light. In this embodiment, when the monitoring light intensity "Es" is present between the upper limit threshold value "Sth(H)" and the lower limit threshold value "Sth (L)", the monitoring control unit 20 judges that a variation of light intensity is limited within an allowable range, and does not update the threshold values with respect to the signal light. In such a case that the monitoring light intensity "Es" is deviated from these upper/lower limit threshold values, the monitoring control unit 20 sets both the upper limit threshold value "Sth (H)" and the lower limit threshold value "Sth (L)", while a value (indicated by black point) of monitoring light intensity "Sm" per 1 wavelength observed at the time when the threshold values was updated is employed as a reference. When intensity "Es" of signal light detected by the detector 42 exceeds the upper limit threshold value "Sth (H)", the monitoring control unit 20 judges that a total wavelength number of the signal light is increased. When intensity "Es" of signal light detected by the detector 42 becomes lower than the lower limit threshold value "Sth (L)", the monitoring control unit 20 judges that a total wavelength number of the signal light is decreased. Since these upper/lower limit threshold values "Sth (H)" and "Sth (L)" must be updated in response to the increase/decrease of the total wavelength number, the monitoring control unit 20 updates these threshold values every time a change of the signal light intensity occurs.

Trigger pulses for updating both the threshold values "Sth (H)" and "Sth (L)" in order to detect this change of the signal light intensity correspond to updating (C2) of the signal light threshold values, and are generated after a variation of the input signal light intensity (C1) with respect to the signal light intensity "Es" had been confirmed, and thereafter, a predetermined time expressed by either "T4" or T2 has elapsed. The reason why the trigger pulses are delayed by the predetermined time is given as follows: That is, such a time duration is considered that variations occurred after the variation with respect to the signal light intensity "Es" had occurred are converged, and then, the intensity of the signal light becomes stable. For example, in the embodiment shown in FIG. 3, in such a case that in the input signal light intensity (C1), the monitoring light intensity "Es" exceeds the threshold value "Slos" for judging whether or not the signal light intensity is present, the monitoring control unit 20 updates the threshold values "Sth (L)" and "Sth (H)" for detecting the variation in the signal light intensity after the time "T4" passes since the monitoring control unit 20 had judged that the monitoring light intensity Es exceeded the threshold value "Slos." Also, the monitoring control unit 20 updates the threshold value for detecting the variation after the monitoring control unit 20 had judged that the signal light intensity exceeded the variation threshold value "Sth (H)" and the change in the total wavelength number occurred, and thereafter, the time "T2" has elapsed. Similarly, the values of these threshold values "Sth (L)" and "Sth (H)" may be selected to be various values in correspondence with an optical transmission system which is to be constructed. For instance, it is conceivable that such values of the signal light intensity "Sm"±3 dB may be applied to these threshold values "Sth (L)" and "Sth (H)."

Also, symbol "Mlos" in the monitoring light intensity (E1) indicates a threshold value of monitoring light intensity which is set in order to judge whether or not the monitoring light is present. When intensity "Em" of monitoring light detected by the detector 46 exceeds the threshold value "Mlos", the monitoring control unit 20 judges that the monitoring light has been entered, and then, commences the constant output intensity control by the optical attenuating unit 35 as indicated in the constant output intensity control (B).

Furthermore, in such a case that the input signal light intensity (C1) has such a change which exceeds the range of the threshold value of either "Sth (H)" or "Sth (L)", the monitoring control unit 20 may alternatively update the monitoring light target value "Em_target (n)" for performing the constant output intensity control with employment of the intensity "Em" of the monitoring light. A trigger pulse for this updating operation is indicated in updating (E2) of the monitor light target value, and the monitoring control unit 20 generates the trigger pulse after a predetermined time expressed by symbol "T3" has elapsed. The reason why the trigger pulse is delayed by the predetermined time is given as follows: That is, such a time duration is considered that variations occurred after the variation with respect to the monitoring light intensity "Em" had occurred are converged, and then, the intensity of the monitoring light becomes stable. Also, in such a case that in the monitoring light intensity (E1) of FIG. 3, the monitoring light intensity "Em" exceeds the threshold value "Mlos" for judging whether or not the signal light intensity is present, the monitoring control unit 20 sets the target value "Em_target (n)" for performing the constant output intensity control after the time "T3" passes since the monitoring control unit 20 had judged that the monitoring light intensity "Em" exceeded the threshold value "Mlos." At this time, the target value "Em_target (n)" may be set by a value of "Ese" if signal light is inputted, whereas the target value "Em_target (n)" may be alternatively set by the initial value of the target value "Em_target (n)" which has been previously set if the signal light is not entered.

Referring now to the signal waveform diagram shown in FIG. 4, a description is made of operations of the optical amplifying unit 30 in the case that a fiber loss changes. Even when a loss 61 of a transmission path shown in a transmission pass loss (E3) occurs, since the constant output intensity control has been carried out with employment of the monitoring light by the optical attenuating unit 35 at the input portion of the optical amplifying unit 30, an intensity of an optical signal passed through the optical attenuating unit 35 does not largely change, so that the intensity variation of the optical signal caused by the fiber loss can be suppressed. Also, since the constant output control has been carried out in the optical attenuating unit 35, as indicated by numeral 62 of the input signal light intensity (C1), the signal light intensity "Es" is converged within the allowable range between the upper limit threshold value "Sth (H)" and the lower limit threshold value "Sth (L)", and the threshold values with respect to the signal light are not updated.

Referring now to the signal waveform diagram shown in FIG. 4, a description is made of operations of the optical amplifying unit 30 in the case that a total number of multiplexed wavelengths changes. As shown in numeral 63 in a wavelength number change (C3), when a total number of wavelengths is increased from "N" waves to "M" waves (M=N1, N2, N3 in FIG. 5), intensity of monitoring light does not change, but only intensity of signal light is increased. As a result, as indicated in the input signal light intensity (C1), the signal light intensity "Es" is varied to exceed the upper limit threshold value "Sth (H)", and thus, the monitoring control unit 20 judges that a change of wavelength numbers has occurred. Then, during a time period from the detection of the wavelength number change up to a time "T2", as represented in the monitoring light target value update (E2), the monitoring control unit 20 suppresses updating of the target value "Em_target (n)" corresponding to the control target value of the constant output intensity control. After the time T2 has elapsed, the monitoring control unit 20 again updates the control target value "Em_target (n)" with respect to the constant output intensity control so as to obtain such a target value "Em_target (n+1)." It should be understood that only updating of the control target value with respect to the constant output intensity control is suppressed, and the constant output intensity control itself is being continuously operated by employing the control target value "Em_target (n)."

In this case, the reason why the control target value of the constant output intensity control is suppressed is given as follows: That is, under such a condition that a total number of multiplexed wavelength has changed, a loss itself as to a transmission path such as an optical fiber does not change, so that a strength of an optical signal outputted from the optical attenuating unit 35 should not be changed. There is such a temporal delay that after the total number of multiplexed wavelengths inputted to the optical amplifying unit 30 has physically changed, the monitoring control unit 20 detects this number change and then updates setting of the wavelength number. While this temporal delay is neglected, if the monitoring control unit 20 updates the control target value "Em_target (n)" by employing the previous wavelength number when a total number of multiplexed signal light changes, since a total number of multiplexed wavelengths grasped by the optical amplifier 33 is different from a total number of multiplexed wavelengths physically entered to the optical amplifier 33, then optical intensity per 1 signal light is controlled to become an erroneous intensity value. As a consequence, at numeral 64 shown in the input signal light intensity (C1), at a time instant when the monitoring control unit 20 senses that a total number (total wavelength number) of multiplexed signal light has changed, the monitoring control unit 20 suppresses updating for the control target value used to perform the constant output intensity control only for the time "T2", as represented in the monitoring light target value update (E2).

Under such a time duration defined by the time "T2", the total number of multiplexed wavelengths physically inputted to the optical amplifying unit 30 is specified; setting operation of new light intensity "Ese" per 1 wavelength which constitutes the target value of the constant output intensity control with respect to the signal light is accomplished; and after the setting operation is accomplished, the control target value "Em_target (n)" of the constant output intensity control with respect to the monitoring light is updated. It should also be understood that as methods for specifying a multiplexed wavelength number by the monitoring control unit 20, the below-mentioned methods may be conceived: Namely, a method that an optical transmission apparatus provided on the upper stream side of an optical transmission system employs a total number of multiplexed signal light contained in monitoring information which is transmitted by monitoring light; a method that the monitoring control unit 20 itself discriminates signal light inputted to the optical amplifier 33 from each other based upon wavelengths thereof so as to detect a present total number of multiplexed signal light; and other methods may be conceived.

Also, in the present embodiment, even when the monitoring control unit 20 judges that there is no intensity of signal light entered to the optical amplifier 33, in such a case that the monitoring control unit 20 judges that there is intensity of monitoring light outputted from the optical attenuating unit 35, the monitoring control unit 20 can continue the constant output intensity control of the optical attenuating unit 35 by employing the target value Em_target (n)" which is presently used. Alternatively, when a new path for an optical signal is opened, if only monitoring light is transmitted through the transmission path prior to signal light and a target value of arbitrary monitoring light intensity such as the initial value of the control target value "Em_target (n)" is set, then a constant output intensity control may be commenced earlier than the conduction of the signal light. Generally speaking, it takes a certain time in order that the optical attenuating unit 35 is brought into such a condition that a constant output intensity control thereof can be carried out. As a result, if only the optical attenuating unit 35 can be brought into the operable condition in advance within the optical transmission apparatus 1, then opening times of optical signal paths can be shortened which are provided in an entire optical transmission system in which plural sets of the above-described optical transmission apparatuses 1 are coupled to each other. As previously described, even when there is no signal light intensity, if the monitoring light intensity is present, then the monitoring control unit 20 of the present embodiment can control the attenuating amount of the optical attenuating unit 35 so as to be brought into such a condition that the constant output intensity control can be carried out.

As previously described, when an optical transmission system is arranged by employing the optical transmission apparatuses according to the present embodiment, even if a loss variation of a transmission path happens to occur, and also, even if a total number of multiplexed wavelengths changes, which are stored in a wavelength multiplexing system, both a constant gain control and a constant output intensity control can be controlled at the same time. As a result, since stability with respect to disturbances and the like can be improved, high quality communication services can be provided.

Figure 5:
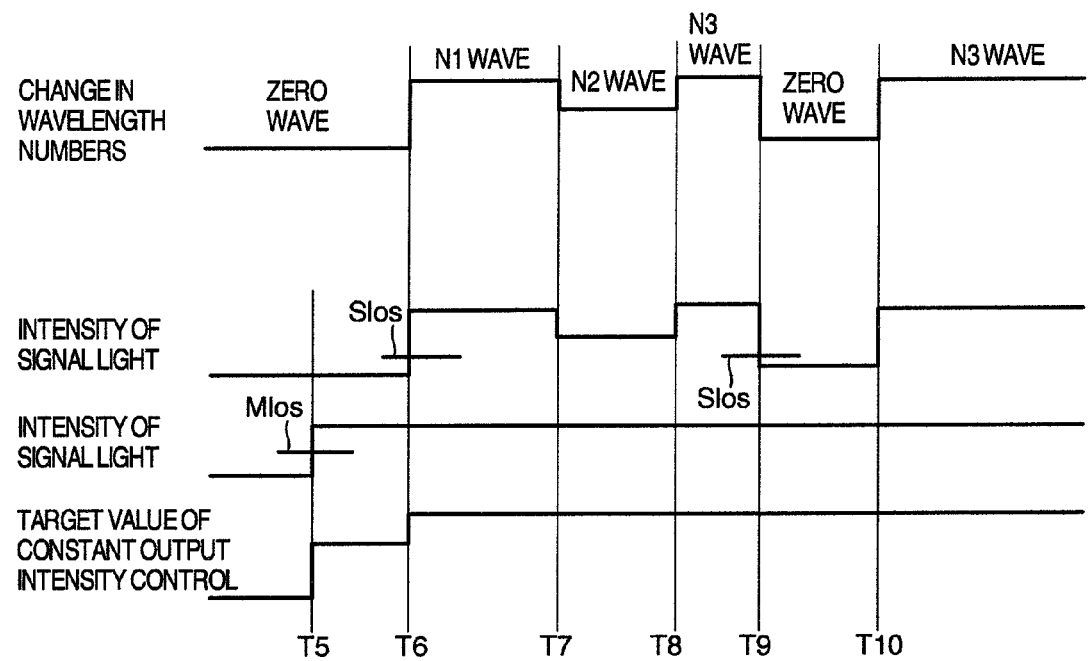
FIG. 5 is an explanatory diagram for explaining the constant output intensity control with employment of optical intensity of monitoring control light of the optical amplifying unit 30.

Next, a description is made of a method for determining the monitoring light target value "Em_target (n)" in such a case that a status where signal light intensity and monitoring light intensity are not present is changed into another status where the signal light intensity and the monitoring light intensity are present, and also, in the case that a total number of wavelengths changes with reference to a signal waveform diagram indicated in FIG. 5. Under such a condition before a time instant "T5", both the monitoring light and the signal light have intensity lower than, or equal to the threshold values "Slos" and "Mlos" for determining whether or not these monitoring light and signal light are present, so that the intensity thereof is under non-intensity present condition. At this time, the constant output intensity control is also stopped.

Next, under such a condition that the monitoring control unit 20 judges that the monitoring light intensity is present, but judges that the signal light intensity is not present in a status of a time instant "T5", since the signal light intensity is not present, the monitoring light target value "Em_target (n)" is set to an arbitrary initial value, and then, the monitoring control unit 20 performs the constant output intensity control by employing this set monitoring light initial value.

Next, in a status of a time instant "T6", in the case that signal light having a wavelength number "N1" is inputted to the optical amplifying unit 30 and the monitoring control unit 20 detects both monitoring light intensity and signal light intensity, the monitoring control unit 20 calculates a monitoring light target value "Em_target (n)" by employing the above-described (formula 1) to (formula 3), and then, controls the optical attenuating unit 35 while the calculated monitoring light target value is defined as a target value of a constant output intensity control. At this time, although the constant output intensity control has been actually carried out with respect to the monitoring light, since the constant output intensity control with respect to the signal light intensity has been equivalently established, such a target has been achieved in which the intensity of the signal light to the optical amplifying unit 33 is controlled to become a predetermined value.

Next, as indicated at time instants T7 and T8, when a total number of wavelengths changes, the signal light intensity "Es" to be observed is increased/decreased in response to the total number of wavelengths. After the time "T2" elapses since the change in the total wavelength numbers has been detected, the monitoring control unit 20 updates the monitoring light intensity "Em_target (n)" to become such a monitoring light intensity "Em_target (n+1)" by employing the above-explained (formula 1) to (formula 3).

Furthermore, at a time instant "T9", when the signal light intensity becomes lower than the threshold value "Slos", the signal light intensity is not completely present, and the total wavelength number becomes zero wave, the monitoring control unit 20 is operated in such a manner that the monitoring light target value "Em_target (n)" is maintained as such a target value obtained before the signal light intensity is not present. As a consequence, even when the signal light intensity is not present, the monitoring control unit 20 can continue the operation of the constant output intensity control.

Moreover, at a time instant T10, in such a case that the signal light intensity exceeds the threshold value "Slos" and the monitoring control unit 20 judges that the signal light intensity is present, after the time "T4" has elapsed, the monitoring control unit 20 again calculates a monitoring light target value "Em_target (n)" based upon the above-explained (formula 1) to (formula 3), and continuously performs the constant output intensity control.

As indicated in the time instant "T9", when the monitoring light target value "Em_target (n)" is calculated in the above-described manner, since the monitoring control unit 20 can store thereinto the preceding value, the monitoring control unit 20 can continuously perform the constant output intensity control by employing the optical attenuating unit 35, and thus, can shorten such a time duration until the signal light intensity is again recovered.

As an initiating method of the optical attenuating unit 35 in the present embodiment, the below-mentioned method is provided. In an actual operation of a wavelength multiplexing system, in order to confirm a connection validity of optical fibers connected to the wavelength multiplexing system, the following work is performed. That is, signal light is conducted to the optical fibers in a test mode so as to confirm intensity of the signal light. In other words, while this confirmation work is carried out, the monitoring control unit 20 can store the monitoring light target value "Em_target (n)" corresponding to the control target value with respect to the constant output intensity control. As a consequence, even in such a case that this connection confirmation work was accomplished and the signal light conducted in the test mode was deleted, the monitoring control unit 20 can continuously perform the constant output intensity control by employing the monitoring light target value "Em_target (n)" which was stored during the test work. Also, when signal light is actually conducted, similar to a time instant "T10", since the constant output intensity control of the optical attenuating unit 35 with employment of the monitoring light target value "Em_target (n)" has already been carried out, so that the initiation time for the optical amplifying unit 30 can be shortened.

Figure 7:
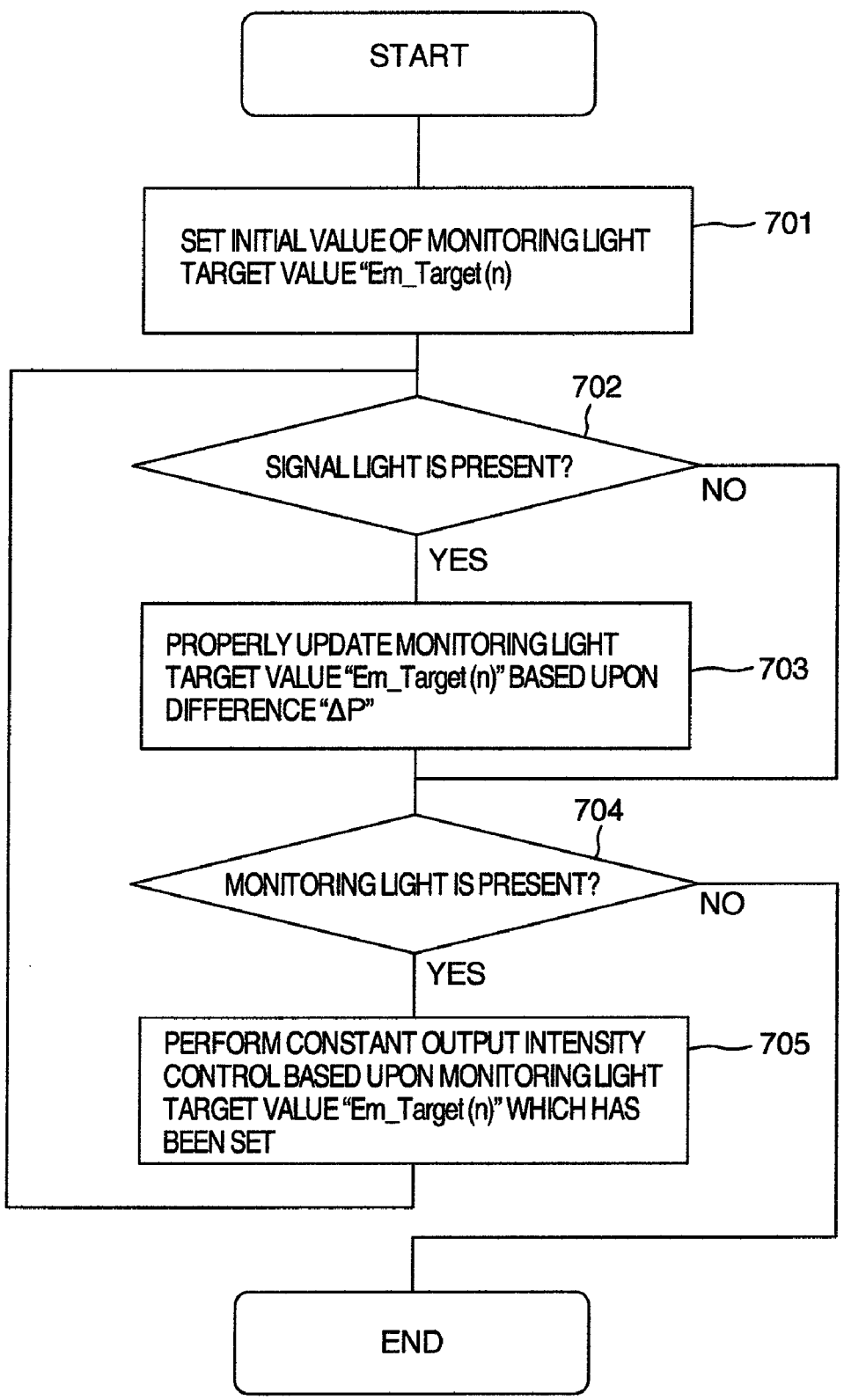
FIG. 7 is a flow chart for describing a constant output intensity control of a monitoring control unit 20.

FIG. 7 is a flow chart for describing a constant output intensity control performed by the monitoring control unit 20. Firstly, the monitoring control unit 20 sets an initial value of the monitoring light target value "Em_target (n)" (step 701). Subsequently, the monitoring control unit 20 checks whether or not signal light has been entered, and if the signal light has been inputted ("YES" of step 702), then the monitoring control unit 20 updates the monitoring light target value "Em_target (n)", if required (step 703). Such a case that this updating operation is required is given as follows: That is, for instance, as shown in a flow chart of FIG. 8, the monitoring control unit 20 judges whether or not signal light intensity "Es" exceeds the upper, or lower limit threshold value "Sth (H)", or "Sth (L)" (step 801); when the signal light intensity "Es" exceeds the threshold value "Sth (H)", or "Sth (L)", the monitoring control unit 20 is brought into a waiting status only for the time "T2" (step 802); and then, the monitoring control unit 20 performs an updating process operation indicated in FIG. 6 (step 803). The updating process operation shown in FIG. 6 includes the process operation (step 601) of the (formula 1), the process operation (step 602) of the (formula 2), and the process operation (step 603) of the (formula 3).

Even when the monitoring control unit 20 judges that the signal light has not been inputted ("NO" of step 702), in such a case that the monitoring control unit 20 judges that the monitoring light has been inputted ("YES" of step 704), the monitoring control unit 20 performs a constant output intensity control with respect to the optical attenuating unit 35 by employing the value of the previously set monitoring light target value "Em_target (n)" (step 705). Also, in the case that the signal light has been entered, when the monitoring control unit 20 judges that the monitoring light has been entered ("YES" of step 704), the monitoring control unit 20 similarly executes the constant output intensity control (step 705). Otherwise, in such a case that the monitoring control unit 20 judges that the monitoring light has disappeared ("NO" of step 704), since the monitoring control unit 20 cannot perform the constant output intensity control, the monitoring control unit 20 ceases the process operation.

When a loss variation happens to occur on an optical transmission path through which both monitoring light and signal light are wavelength-multiplexed and the wavelength-multiplexed signal light is transmitted, optical intensity of the monitoring light changes in addition to optical intensity of the signal light. Also, in such a case that a total number (total wavelength number) of the multiplexed signal light changes on the upstream side, only the intensity of the signal light changes. While the optical transmission apparatus of the present invention utilizes the above-described property of the optical transmission system, since the optical transmission apparatus of the present invention performs the constant output intensity control with respect to the intensity of the light as the control subject, the optical transmission apparatus can maintain the intensity of the light outputted from the optical amplifier as the constant light intensity. Also, since the optical transmission apparatus of the present invention performs the constant gain control with respect to the intensity of the signal light as the control subject, the optical transmission apparatus can maintain the intensity of the signal light per a wavelength as the constant light intensity.

As a consequence, in accordance with the present embodiment, even in such a case that the total number of the signal light changes, which has been stored in the optical transmission system, the constant gain control can be realized, so that the communication qualities can be guaranteed with respect to the signal light which has already been stored and to which the services have already been commenced.

Also, in accordance with the present embodiment, even in such a case that the losses of the optical fibers and the like change, which couple the optical transmission systems arranged in remote places to each other, the constant output intensity control can be realized, so that the communication qualities can be guaranteed with respect to the signal light which has already been stored and to which the services have already been commenced.

Also, in accordance with the present embodiment, since the control subjects with respect to the above-described constant output intensity control and the above-explained gain constant control are different from each other, the respective control subjects can be independently controlled. As a consequence, even in such a case that both the change for the total number of the signal light, and the loss change of the optical fiber occur at the same time, both the above-described controls can be driven at the same time.

Also, in accordance with the present embodiment, even when there is no signal light inputted to the optical transmission system, the optical attenuating unit mounted on the optical amplifying unit can be previously adjusted. Thus, when the signal light is firstly transmitted in the optical transmission system, the initiation time of the optical amplifying unit can be shortened.

Further, in accordance with the present embodiment, even when there is no signal light inputted to the optical transmission system, since the signal light intensity once passes through the optical transmission system, the correct attenuation amount with respect to the optical attenuating unit can be held, and when the signal light is transmitted at a second time, the initiation time of the optical amplifying unit can be furthermore shortened.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An optical transmission apparatus for adjusting optical intensity of wavelength-multiplexed signal light so as to relay the intensity-adjusted wavelength-multiplexed signal light between optical transmission paths, comprising:

an optical attenuator whose attenuating amount is variable, for attenuating optical intensity of wavelength-multiplexed signal light received from the optical transmission path;

a first optical intensity monitoring unit for demultiplexing an optical signal having a certain wavelength from the wavelength-multiplexed signal light passed through said optical attenuator so as to monitor optical intensity of said demultiplexed optical signal;

a second optical intensity monitoring unit for branching a portion of the wavelength-multiplexed signal light passed through said optical attenuator so as to monitor optical intensity of the branched wavelength-multiplexed signal light;

an optical amplifier for amplifying a portion of the wavelength-multiplexed signal light;

a third optical intensity monitoring unit for branching a portion of the amplified wavelength-multiplexed signal light outputted from said optical amplifier so as to monitor optical intensity of said branched wavelength-multiplexed signal light; and a control unit for controlling the attenuating amount of said optical attenuator in such a manner that the optical intensity of the optical signal monitored by said first optical intensity monitoring unit is approximated to a first target value, and for controlling a gain of said optical amplifier in such a manner that a ratio of the optical intensity of said wavelength-multiplexed signal light monitored by said second optical intensity monitoring unit to the optical intensity of said wavelength-multiplexed signal light monitored by said third optical intensity monitoring unit is approximated to a second target value;

wherein:

said control unit divides the optical intensity of said wavelength-multiplexed signal light monitored by said second optical intensity monitoring unit by a total wavelength multiplexing number so as to calculate intensity of signal light per 1 wavelength;

said control unit calculates a difference between the intensity of said signal light per 1 wavelength and a third target value; and said control unit updates said first target value based upon said calculated difference.

2. An optical transmission apparatus as claimed in claim 1 wherein:

said control unit updates said first target value in a periodic manner.

3. An optical transmission apparatus for adjusting optical intensity of wavelength-multiplexed signal light so as to relay the intensity-adjusted wavelength-multiplexed signal light between optical transmission paths, comprising:

an optical attenuator whose attenuating amount is variable, for attenuating optical intensity of wavelength-multiplexed signal light received from the optical transmission path;

a first optical intensity monitoring unit for demultiplexing an optical signal having a certain wavelength from the wavelength-multiplexed signal light passed through said optical attenuator so as to monitor optical intensity of said demultiplexed optical signal;

a second optical intensity monitoring unit for branching a portion of the wavelength-multiplexed signal light passed through said optical attenuator so as to monitor optical intensity of the branched wavelength-multiplexed signal light;

an optical amplifier for amplifying a portion of the wavelength-multiplexed signal light;

a third optical intensity monitoring unit for branching a portion of the amplified wavelength-multiplexed signal light outputted from said optical amplifier so as to monitor optical intensity of said branched wavelength-multiplexed signal light; and a control unit for controlling the attenuating amount of said optical attenuator in such a manner that the optical intensity of the optical signal monitored by said first optical intensity monitoring unit is approximated to a first target value, and for controlling a gain of said optical amplifier in such a manner that a ratio of the optical intensity of said wavelength-multiplexed signal light monitored by said second optical intensity monitoring unit to the optical intensity of said wavelength-multiplexed signal light monitored by said third optical intensity monitoring unit is approximated to a second target value;

wherein:

said control unit judges whether or not the optical intensity of said wavelength-multiplexed signal light monitored by said second optical intensity monitoring unit is located between a first threshold value and a second threshold value, which are provided in order to detect a change in multiplexed-wavelength numbers;

when said control unit judges that the optical intensity of said wavelength-multiplexed signal light is deviated from a range defined by said first and second threshold values, said control unit controls said optical attenuator by employing said first target value used at a time instant of said judgement made by the control unit for such a time duration until a predetermined time elapses after said judgement was made; and wherein:

when said predetermined time has elapsed, said control unit divides the optical intensity of said wavelength-multiplexed signal light monitored by said second optical intensity monitoring unit by a total wavelength multiplexing number so as to calculate intensity of signal light per 1 wavelength;

said control unit calculates a difference between the intensity of said signal light per 1 wavelength and a third target value; and said control unit updates said first target value based upon said calculated difference.

4. An optical transmission apparatus as claimed in claim 3 wherein:

when said predetermined time has elapsed, said control unit updates both said first threshold value and said second threshold value based upon the optical intensity of said wavelength-multiplexed signal light monitored by said second optical intensity monitoring unit.

5. An optical transmission apparatus configured to adjust an optical intensity of a wavelength-multiplexed signal light so as to relay the intensity-adjusted wavelength-multiplexed signal light between optical transmission paths, the optical transmission apparatus comprising:

an optical attenuator with a variable attenuating amount, configured to attenuate an optical intensity of a wavelength-multiplexed signal light received from the optical transmission path;

a first optical intensity monitoring unit, configured to demultiplex an optical signal having a certain wavelength from the wavelength-multiplexed signal light passed through said optical attenuator so as to monitor optical intensity of said demultiplexed optical signal;

a second optical intensity monitoring unit, configured to branch a portion of the wavelength-multiplexed signal light passed through said optical attenuator so as to monitor optical intensity of the branched wavelength-multiplexed signal light;

an optical amplifier, configured to amplify a portion of the wavelength-multiplexed signal light;

a third optical intensity monitoring unit, configured to branch a portion of the amplified wavelength-multiplexed signal light outputted from said optical amplifier so as to monitor optical intensity of said branched wavelength-multiplexed signal light; and a control unit, configured to control the attenuating amount of said optical attenuator in such a manner that the optical intensity of the optical signal monitored by said first optical intensity monitoring unit is approximated to a first target value, and configured to control a gain of said optical amplifier in such a manner that a ratio of the optical intensity of said wavelength-multiplexed signal light monitored by said second optical intensity monitoring unit to the optical intensity of said wavelength-multiplexed signal light monitored by said third optical intensity monitoring unit is approximated to a second target value;

wherein said control unit is configured to divide the optical intensity of said wavelength-multiplexed signal light monitored by said second optical intensity monitoring unit by a total wavelength multiplexing number so as to calculate intensity of signal light per 1 wavelength;

wherein said control unit is configured to calculate a difference between the intensity of said signal light per 1 wavelength and a third target value; and wherein said control unit is configured to update said first target value based upon said calculated difference.

6. An optical transmission apparatus as claimed in claim 5, wherein said control unit is configured to update said first target value in a periodic manner.

7. An optical transmission apparatus configured to adjust an optical intensity of a wavelength-multiplexed signal light so as to relay the intensity-adjusted wavelength-multiplexed signal light between optical transmission paths, the optical transmission apparatus comprising:

an optical attenuator with a variable attenuating amount, configured to attenuate an optical intensity of a wavelength-multiplexed signal light received from the optical transmission path;

a first optical intensity monitoring unit, configured to demultiplex an optical signal having a certain wavelength from the wavelength-multiplexed signal light passed through said optical attenuator so as to monitor optical intensity of said demultiplexed optical signal;

a second optical intensity monitoring unit, configured to branch a portion of the wavelength-multiplexed signal light passed through said optical attenuator so as to monitor optical intensity of the branched wavelength-multiplexed signal light;

an optical amplifier, configured to amplify a portion of the wavelength-multiplexed signal light;

a third optical intensity monitoring unit, configured to branch a portion of the amplified wavelength-multiplexed signal light outputted from said optical amplifier so as to monitor optical intensity of said branched wavelength-multiplexed signal light; and a control unit, configured to control the attenuating amount of said optical attenuator in such a manner that the optical intensity of the optical signal monitored by said first optical intensity monitoring unit is approximated to a first target value, and configured to control a gain of said optical amplifier in such a manner that a ratio of the optical intensity of said wavelength-multiplexed signal light monitored by said second optical intensity monitoring unit to the optical intensity of said wavelength-multiplexed signal light monitored by said third optical intensity monitoring unit is approximated to a second target value;

wherein said control unit is configured to judge whether or not the optical intensity of said wavelength-multiplexed signal light monitored by said second optical intensity monitoring unit is located between a first threshold value and a second threshold value, the first threshold value and the second threshold value being provided in order to detect a change in multiplexed-wavelength numbers;

wherein when said control unit judges that the optical intensity of said wavelength-multiplexed signal light is deviated from a range defined by said first and second threshold values, said control unit is configured to control said optical attenuator by employing said first target value used at a time instant of said judgment made by the control unit for such a time duration until a predetermined time elapses after said judgment was made; and wherein when said predetermined time has elapsed, said control unit is configured to divide the optical intensity of said wavelength-multiplexed signal light monitored by said second optical intensity monitoring unit, by a total wavelength multiplexing number, so as to calculate intensity of signal light per 1 wavelength, said control unit is configured to calculate a difference between the intensity of said signal light per 1 wavelength and a third target value, and said control unit is configured to said first target value based upon said calculated difference.

8. An optical transmission apparatus as claimed in claim 7, wherein when said predetermined time has elapsed, said control unit is configured to update both said first threshold value and said second threshold value based upon the optical intensity of said wavelength-multiplexed signal light monitored by said second optical intensity monitoring unit.

* * * * *